Figures 1, 2, 3:
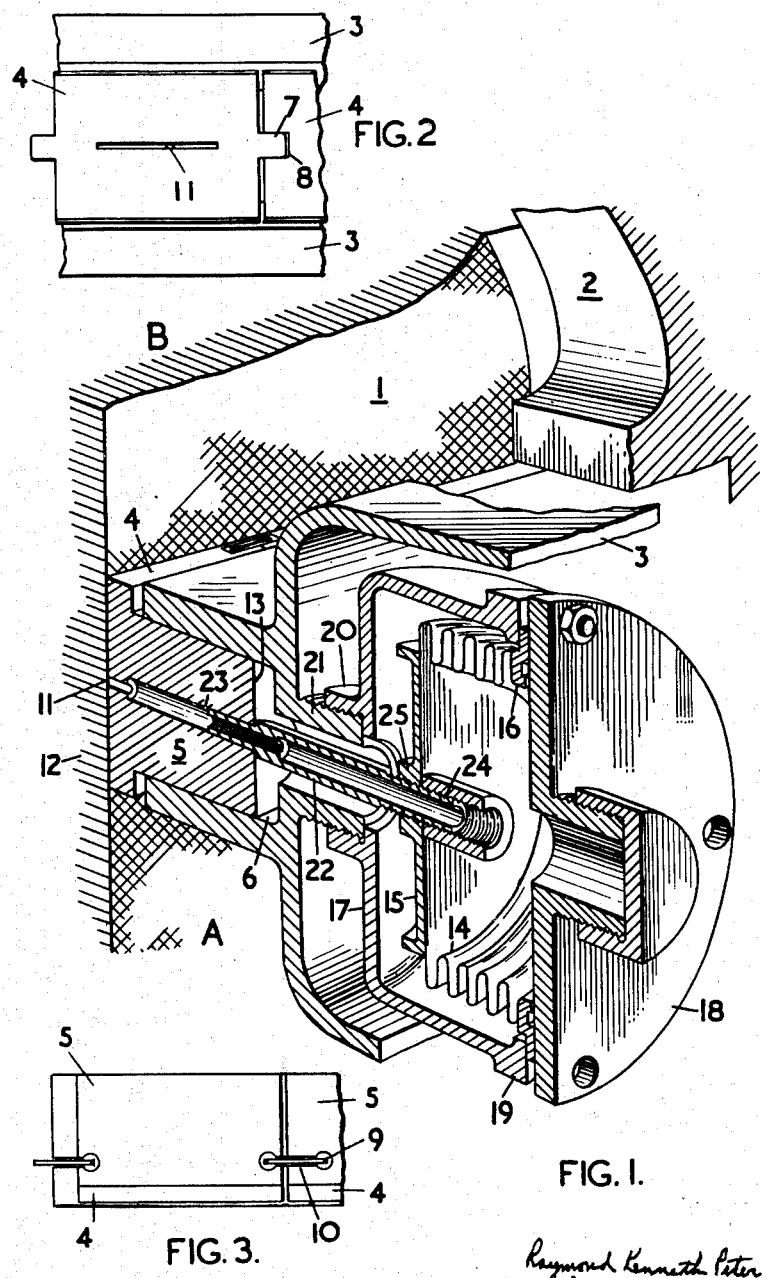

May 11, 1954  R. K. P. STEVENS ET AL  2,678,193
SEALING DEVICE FOR REGENERATIVE HEAT EXCHANGERS
Filed Sept. 6, 1950

Raymond Kenneth Peter Stevens
Martin Cox
Inventors

By
Stevens, Davis, Miller & Mosher
their Attorneys

Patented May 11, 1954

2,678,193

UNITED STATES PATENT OFFICE 2,678,193

SEALING DEVICE FOR REGENERATIVE HEAT EXCHANGERS

Raymond Kenneth Peter Stevens, Farnham, and Martin Cox, Cove, Farnborough, England, assignors to Power Jets (Research and Development) Limited, London, England, a British company Application September 6, 1950, Serial No. 183,438

4 Claims. (Cl. 257—6)

This invention relates to sealing systems in which a sealing element abuts against a surface of a moving member to separate chambers at different pressures through which the member passes.

A requirement for such a sealing system is to be found in rotary regentrative heat exchangers of the kind in which a heat absorbing and transmitting matrix member is rotatable in a casing partitioned by dividing and sealing members into fluid paths for a fluid at a high temperature and a fluid at a lower temperature so that as the member rotates it absorbs heat from the high temperature fluid and transmits it to the lower temperature fluid.

It is to apparatus of the kind referred to that the invention has its primary application, especially when the pressure difference between the high and the lower temperature fluids is high as in gas turbine plant.

It is desirable to urge the sealing elements against the surface of the moving member under a positive load but the load must not be excessive otherwise the elements will act as brake shoes and retard the rotation of the moving member and cause considerable wear to the member and to themselves.

Difficulties arise when the sealing elements are movable and one of the fluids is at a high pressure because the high pressure fluid may leak behind the elements and assist in urging them against the moving member or heat exchanger matrix even when precautions against such leakage have been taken.

The invention offers a solution to the loading of the elements under positive load without the high pressure fluid leakage behind the elements overloading them.

According to the present invention in a sealing system in which a movable sealing element abuts against a surface of a moving member to separate chambers at different pressures there is provided a sealing element loading device so arranged that the load on the element due to the higher pressure fluid leakage acting on the element is compensated by an opposing load whilst the element itself is operated independently on the leakages load, preferably by the higher pressure fluid against which the system is to operate. The higher pressure fluid leakage may be arranged to provide the opposing load on the element whilst the fluid for operating the sealing element loading means may be derived from the higher pressure fluid at an intermediate region on the sealing face of the element. In such circumstances the higher pressure leakage fluid and the fluid for loading the element may be applied to the opposite sides of a bellows diaphragm or piston forming the loading device. The area of the bellows diaphragm or piston and the area of the element subjected to the higher pressure leakage fluid may be made substantially equal to provide a pressure balance to enable the loading of the element to be entirely unaffected by the leakage fluid.

In the case of the disc type of movable member or heat exchange matrix where the sealing element is arranged to extend across the face of the member or matrix, the load holding the element to the face of the member or matrix should vary along the length of the sealing element.

A feature of the invention therefore consists in the division of the sealing element into short sections or units each of which is independently movable and independently loaded by its own loading device.

Each unit and its loading device is pressure balanced to the higher pressure leakage fluid so that they are unaffected thereby and each unit is provided with a bleed duct or passage extending from the centre point in the sealing face of the unit to the loading device for the passage of pressure fluid to operate the device so that the only load urging the unit to contact the face of the member or matrix is the load derived from the loading device.

One form of the invention will now be described by way of example only with reference to the accompanying drawing in which Figure 1 is a fragmentary sectional view of a heat exchanger with movable matrix disc and sealing system consisting of a dividing member with yieldable sealing elements or units. Figure 2 is a view of the rubbing or sealing face of a sealing element or unit. Figure 3 is a plan view of a sealing element or unit.

A movable matrix 1, which is of the disc type and composed of plain and corrugated metal strips arranged alternately to one another to form a cellular structure is rotatable in a casing 2. The casing 2 is divided by a dividing member 3 extending diagonally across the face of the matrix 1 into two fluid paths A and B for a fluid at a high temperature and low pressure and a fluid at low temperature and high pressure. The dividing member 3 is provided with a number of sealing elements or units 4 for rubbing contact with the face of the matrix 1.

Each unit 4 is provided with a tongue 5 sliding freely in a groove 6 in the dividing member 3. Each unit 4 is made comparatively short relative to the length of the dividing member 3 so that the seal as a whole is locally yieldable and can adjust itself to any distortion of the matrix 1 as it passes to and from the fluids at different temperatures.

Each sealing unit 4 is provided with sealing means 7, 8 and 9, 10 between their interfaces to prevent loss of pressure between the high temperature low pressure and low temperature high pressure sides A and B of the matrix 1. Thus in one plane (i. e. normal to the surface of the matrix 1) each sealing unit 4 is formed with tongue and groove seals 7 and 8 and the other plane (i. e. parallel with the face of the matrix 1) a dumb-bell shaped element 9 arranged half in one sealing unit 4 and half in the adjacent unit 4 in grooves 10.

The difference in pressure between the two flows A and B will induce a leakage of high pressure fluid flowing between the face of each sealing section or units 4 and the face of the matrix 1 from A to B and there will be a drop in pressure across the face 12 of each unit 4. The pressure acting on the face 12 of each unit 4 will tend to force it away from the matrix 1 and in consequence a load opposing this pressure is necessary to hold each unit 4 in contact with the matrix 1. The load to hold the unit 4 in contact is provided by fluid bled away from the face of each unit 4 and is tapped from a position selected to give a balanced loading, just sufficient to hold the unit in contact with the matrix 1. It has been found that the position to give a balanced loading is approximately the centre of the face 12 of the unit 4. A bleed duct or passage 11 is therefore provided centrally in each unit 4 and extends from the rubbing face 12 to the rear face 13 of each unit 4. If the fluid tapped by the passage 11 is merely applied to the space left between the tongue 5 and the bottom of the groove 6 at the rear of the unit 4 to act on the rear face 13 to hold the unit 4 against the matrix 1 it has been found that leakage of high pressure fluid between the rubbing faces of the tongue 5 and groove 6 between the rubbing faces of adjacent units 4 causes considerable trouble in overloading the units 4 and causing them to bear heavily on the face of the matrix 1 with consequent high wear.

Each unit 4 is therefore provided with individual fluid pressure loading means or bellows 14 for holding it against the matrix face. The fluid pressure loading means or bellows 14 is operated by pressure fluid derived solely from a selected part of the face 12 of the unit 4. The operation of the bellows 14 is unaffected by any leakage or high pressure fluid as the rear face 13 of the unit 4 and the bellows 14 are pressure balanced, i. e. the area of the rear face 13 of the unit 4 and the area of the bellows 14 on which the high pressure fluid leakage acts are made substantially equal.

The bellows 14 is provided at its ends with an end plate 15 and a ring member 16. The bellows 14 is secured within a dished member 17 by clamping the ring member 16 between a cover plate 18 and the flanged rim 19 of the dished member 17. The bellows 14 within the dished member 17 is arranged in axial alignment with the passage 11 by securing the dished member 17 to the member 3, for example, by connecting a hollow screwed socket 20, formed on the base of the dished member 17 and a hollow screwed spigot 21 formed in the member 3 leading to the recess 6.

A tubular member 22 extends through the spigot and socket joint 21, 20, and connects the unit 4 and the bellows 14 together, one end 23 being screwed into the end of the passage 11 in the unit 4 whilst the other end 24 is screwed into a boss 25 in the centre of the end plate 15 of the bellows 14. The passage 11 is thus in direct communication with the interior of the bellows 14 whilst the recess 6 and the interior of the dished member 17 are connected so that the unit 4 and the bellows 14 are pressure balanced to any high pressure leakage that may pass between the rubbing faces of the tongue 5 and groove 6. The passage of the operating fluid from the face 12 to the bellows 14 and the operation of the bellows 14 is entirely unaffected by any leakage of fluid.

Each unit 4 in dividing member 3 is provided with its own bellows 14, the interior of which is subjected to the actuating pressure fluid obtained from the selected point on its contacting face 12 to hold it against the face of the matrix 1. Instead of a bellows 14, a piston slidable in a cylinder or a diaphragm could be used to maintain the unit 4 pressed against the matrix 1.

What we claim is:

1. In a regenerative heat exchanger having a casing defining a path for a fluid at a high temperature and a path for a fluid at a lower temperature and having at least one rotatable matrix member of disc form containing heat absorbing and heat transmitting material supported in said casing for rotation transversely of said fluid paths with its faces bathed in said fluids for an exchange of heat between said fluids and in which one of said fluids is at a higher pressure and the other is at a lower pressure, a sealing device cooperating with said casing and said disc member comprising a dividing member stretched across said casing to separate said fluids having an opening therein through which said disc member projects into said two fluid paths and having channels therein bounding said opening with each channel opening facing said face of said disc member, a plurality of separate and distinct sealing units arranged side by side in each said channel for sliding movement individually and independently of the others towards and away from said disc member and for forming an uninterrupted barrier collectively when engaging said face of said disc member in rubbing contact to prevent substantial leakage of high pressure fluid passing between them and said disc member, each sealing unit having a rubbing face engaging said disc member and a rear face in said channel and a passage extending therethrough from said rubbing face to said rear face to collect high pressure fluid leaking between said rubbing face and said disc member face, a plurality of fluid pressure operated diaphragm motors, one for each sealing unit, each having a body defining a pressure chamber carried on said dividing member adjacent said channel, a diaphragm and a thrust-transmitting element attached to said sealing unit and to said diaphragm, the latter forming one wall of said chamber having one side exposed to fluid in said chamber and the other side exposed to fluid in said channel and a connecting duct connecting said chamber to said sealing unit passage to receive said high pressure leakage fluid to load said diaphragm in said chamber and urge said sealing unit into engagement with said disc member, said diaphragm having an area substantially equal to the area of said rear face of said sealing unit so that other high pressure fluid leakage between said sealing unit and said channel also to load said sealing unit also loads said diaphragm to compensate for such loading.

2. In a regenerative heat exchanger having a casing defining a path for a fluid at a high temperature and a path for a fluid at a lower temperature and having at least one rotatable matrix member of disc form containing heat absorbing and heat transmitting material supported in said casing for rotation transversely of said fluid paths with its faces bathed in said fluids for an exchange of heat between said fluids and in which one of said fluids is at a higher pressure and the other is at a lower pressure, a sealing device co-operating with said casing and said disc member comprising a dividing member mounted across said casing to separate said fluids and having an opening therein through which said disc member projects into said two fluid paths and having channels therein bounding said opening with each channel opening facing said face of said disc member, a plurality of separate and distinct sealing units arranged side by side in each said channel for sliding movement individually and independently of the others towards and away from said disc member and for forming an uninterrupted barrier collectively when engaging said face of said disc member in rubbing contact to prevent substantial leakage of high pressure fluid passing between them and said disc member, each sealing unit having a rubbing face engaging said disc member and a rear face in said channel and a passage extending therethrough from said rubbing face to said rear face to collect high pressure fluid leaking between said rubbing face and said disc member face, a plurality of pressure operated loading means carried on said dividing member adjacent said sealing unit channels, one associated with each sealing unit and coupled thereto by a thrust-transmitting element for urging it into engagement with said disc member face and receiving high pressure leakage fluid from said sealing unit passage to operate it, said loading means having an operating area substantially equal to the area of its said associated sealing unit rear face and being constructed and arranged so that other high pressure fluid leakage between said sealing unit and said channel also to load said sealing unit also loads said loading means to compensate for such loading.

3. In a regenerative heat exchanger having a casing defining a path for a fluid at a high temperature and a path for a fluid at a lower temperature and having at least one rotatable matrix member of disc form containing heat absorbing and heat transmitting material supported in said casing for rotation transversely of said fluid paths with its faces bathed in said fluids for an exchange of heat between said fluids and in which one of said fluids is at a higher pressure and the other is at a lower pressure, a sealing device co-operating with said casing and said disc member comprising a dividing member mounted across said casing to separate said fluids and having an opening therein through which said disc member projects into said two fluid paths and having channels therein bounding said opening with each channel opening facing said face of said disc member, a plurality of separate and distinct sealing units arranged side by side in each said channel for sliding movement individually and independently of the others towards and away from said disc member and for forming an uninterrupted barrier collectively when engaging said face of said disc member in rubbing contact to prevent substantial leakage of high pressure fluid passing between them and said disc member, each sealing unit having a rubbing face engaging said disc member and a rear face in said channel and a passage extending therethrough from said rubbing face to said rear face to collect high pressure fluid leaking between said rubbing face and said disc member face, a plurality of fluid pressure operated diaphragm motors, one for each sealing unit, each having a body defining a pressure chamber carried on said dividing member adjacent said channel and with its axis of movement in axial alignment with said sealing unit passage, a diaphragm coupled directly by a thrust-transmitting member to its said sealing unit and forming one wall of said chamber having one side exposed to fluid in said chamber and the other side exposed to fluid in said channel and a connecting duct constituting the thrust-transmitting member coupling said diaphragm to said sealing unit connecting said chamber to said sealing unit passage to receive high pressure leakage fluid to load said diaphragm in said chamber to urge said sealing unit into engagement with said disc member, said diaphragm having an area substantially equal to the area of said rear face of said sealing unit so that other high pressure fluid leakage between said sealing unit and said channel also to load said sealing element also loads said diaphragm to compensate for such loading.

4. In a regenerative heat exchanger having a casing defining a path for a fluid at a high temperature and a path for a fluid at a lower temperature and having at least one rotatable matrix member of disc form containing heat absorbing and heat transmitting material supported in said casing for rotation transversely of said fluid paths with its faces bathed in said fluids for an exchange of heat between said fluids and in which one of said fluids is at a higher pressure and the other is at a lower pressure, a sealing device co-operating with said casing and said disc member comprising a dividing member mounted across said casing to separate said fluids and having an opening therein through which said disc member projects into said two fluid paths and having channels therein bounding said opening with each channel opening facing said face of said disc member, a plurality of separate and distinct sealing units arranged side by side in each said channel for sliding movement individually and independently of the others towards and away from said disc member and for forming an uninterrupted barrier collectively when engaging said face of said disc member in rubbing contact to prevent substantial leakage of high pressure fluid passing between them and said disc member, each sealing unit having a rubbing face engaging said disc member and a rear face in said channel and a passage extending therethrough from the centre of said rubbing face to the centre of said rear face to collect high pressure fluid leaking between said rubbing face and said disc member face, a plurality of fluid pressure operated corrugated bellows, one for each sealing unit, each defining a chamber and contained in a body carried on said dividing member adjacent said channel and open thereto and with the axis of movement of said bellows in axial alignment with said centrally disposed sealing unit passage and having a connecting duct constituting a rigid thrust-transmitting link between said bellows and said sealing unit for passing said high pressure leakage fluid to the interior of said bellows to load it to urge said sealing unit into engagement with said disc member, said bellows having an area substantially equal to the area of said rear face of said sealing unit so that other high pressure leaking between said sealing unit and said channel also to load said sealing unit also loads said bellows externally to compensate for such loading.

References Cited in the file of this patent

UNITED STATES PATENTS

| Number | Name | Date |
| --- | --- | --- |
| 1,835,877 | Joyce | Dec. 8, 1931 |
| 2,010,930 | Rowe | Aug. 13, 1935 |
| 2,036,308 | Vroom | Apr. 7, 1936 |
| 2,579,211 | Stevens et al. | Dec. 18, 1951 |